United States Patent [19]

Hurd

[11] 4,335,566
[45] Jun. 22, 1982

[54] CONTROL SYSTEM FOR POWER EQUIPMENT

[75] Inventor: Lyle E. Hurd, Bloomington, Minn.

[73] Assignee: The Toro Company, Minneapolis, Minn.

[21] Appl. No.: 224,701

[22] Filed: Jan. 12, 1981

[51] Int. Cl.³ .......................................... A01D 35/26
[52] U.S. Cl. ...................................... 56/11.8; 56/11.3; 74/480 B
[58] Field of Search ...................... 56/10.5, 11.3, 11.8; 74/480 B

[56] References Cited

U.S. PATENT DOCUMENTS

| | | | |
|---|---|---|---|
| 3,958,398 | 5/1976 | Fuelling et al. | 56/10.5 |
| 4,041,679 | 8/1977 | Seifert et al. | 56/11.3 |
| 4,117,652 | 10/1978 | Jones et al. | 56/11.8 |
| 4,144,956 | 3/1979 | Baba | 74/480 B |
| 4,195,466 | 4/1980 | Heismann | 56/10.5 |
| 4,195,534 | 4/1980 | Prince | 74/480 B |
| 4,205,738 | 6/1980 | Baba | 74/480 B |
| 4,212,141 | 7/1980 | Miyazawa et al. | 56/11.3 |
| 4,295,326 | 10/1981 | Green | 56/11.3 |

*Primary Examiner*—Robert A. Hafer
*Attorney, Agent, or Firm*—James W. Miller

[57] ABSTRACT

A control system (20) for an outdoor power equipment unit (2) includes a control member (22) pivotally mounted on the housing (4) of unit (2). Control member (22) rotates in a first direction from a neutral position to a first position in which a brake and clutch drive is actuated to a second position in which a traction drive for housing (4) is actuated. A latch (60) stops rotation of control member (22) in the first position since the clutch comprises a selectively operable drive motor (6) and the first position is the proper position for starting the drive motor (6). Latch (60) is releasable to allow continued rotation of control member (22) to its second engaged position.

8 Claims, 7 Drawing Figures

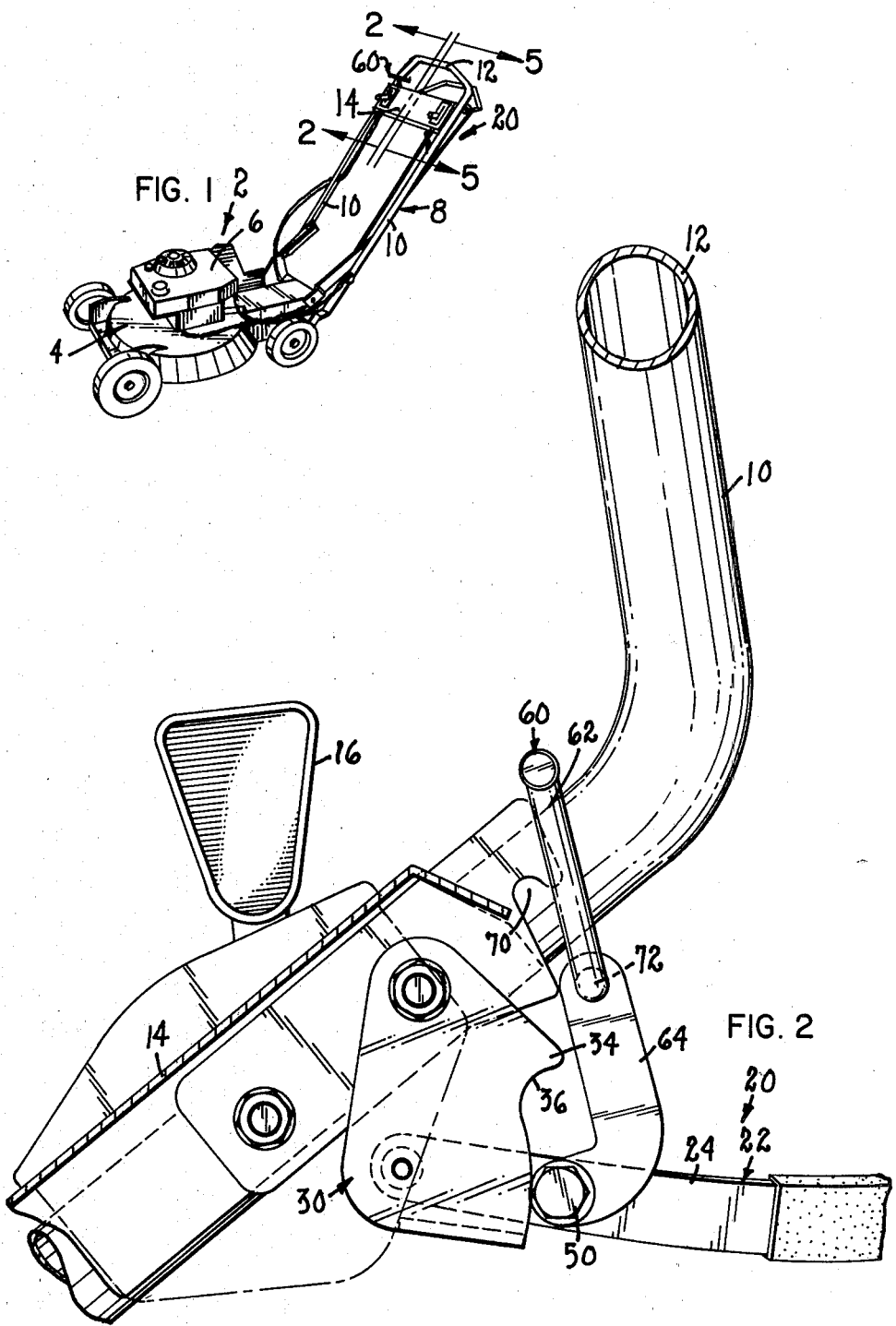

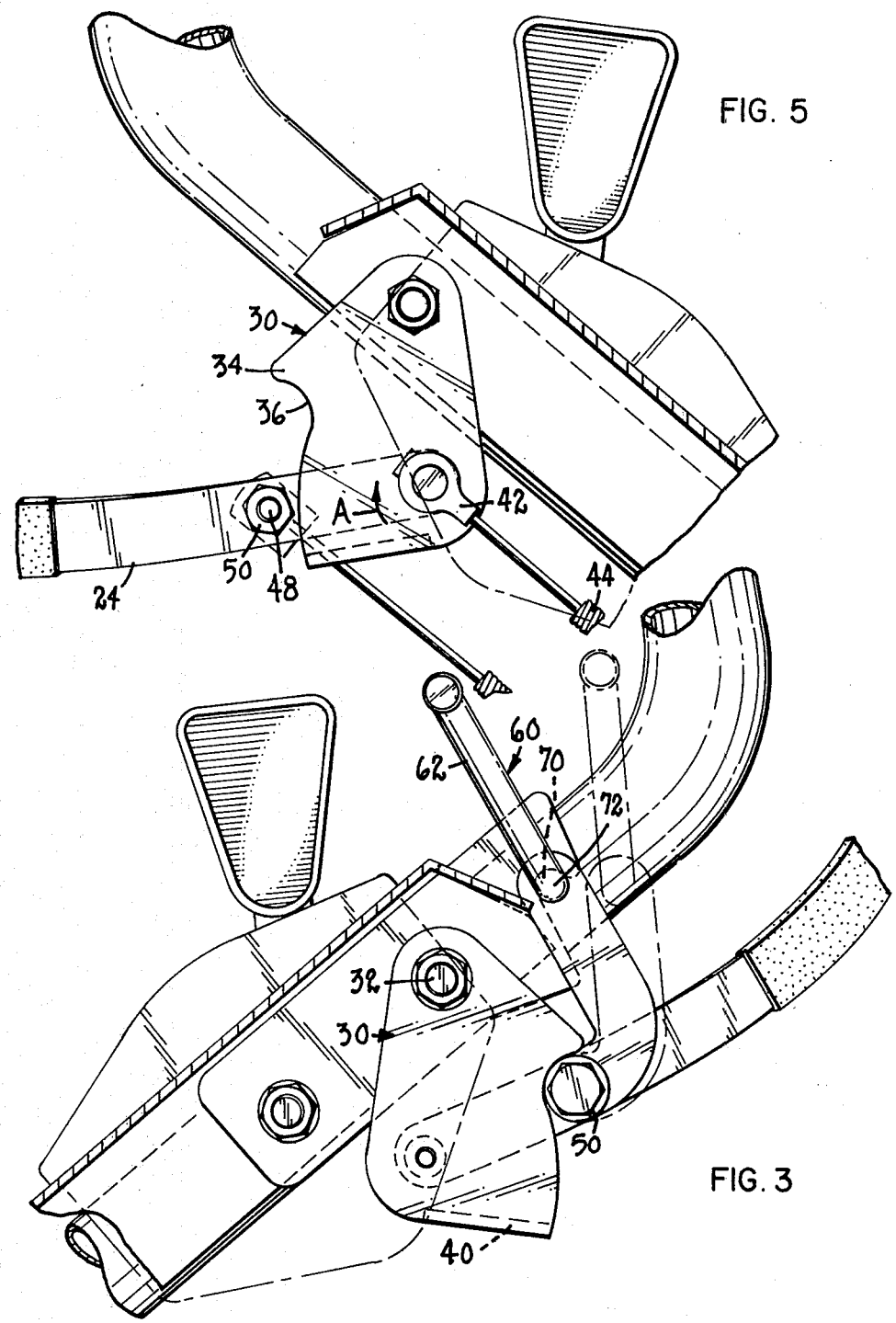

CONTROL SYSTEM FOR POWER EQUIPMENT

TECHNICAL FIELD

This invention relates generally to a control system for an outdoor power equipment unit of the type having a power driven active element and a traction drive. More particularly, this invention relates to a control system for a lawn mowing device having a rotatable cutting element, a brake and clutch device for selectively operating the cutting element and a traction drive for the mower housing.

BACKGROUND OF THE INVENTION

Rotary lawn mowers are known which comprise a mower housing, a rigid cutting blade rotatable in a cutting chamber in the housing and a traction drive for self-propelling the mower housing over the ground. Such machines may have a dead-man's control for operating the traction drive. Such a control is offered on certain lawn mowers manufactured by The Toro Company, Minneapolis, Minn., the assignee of the present invention. This type of control usually comprises a pivotally mounted control bar carried on the handle assembly of the mower. Whenever the operator releases the bar, the control bar falls to a neutral position in which the traction drive is disengaged.

Lawn mowers which use a rigid steel blade as the cutting element present a safety problem. Such a blade when rotating is capable of doing injury to the operator. Operators have had fingers or toes injured or severed by this type of blade. Such accidents will occur either due to the carelessness of the operator or by virtue of an unforeseen set of circumstances leading to the injury. It is, therefore, desirable that any lawn mower having a rigid cutting element such as a blade be equipped with a blade brake clutch for stopping the cutting blade whenever it poses a danger to the operator. Some prior art lawn mowers have been equipped with such blade brake clutches. In addition, some of these lawn mowers used a dead-man's control for actuating the blade brake clutch.

To the best of Applicant's knowledge every lawn mower having both a traction drive and a blade brake clutch has utilized two separate dead-man's controls for actuating these two elements individually. This is duplicative of materials and, therefore, relatively expensive. Moreover, it also presents two separate controls each of which must be manually actuated by the operator to get both the traction drive function and rotation of the cutting blade. This may be confusing and cumbersome to some operators.

Moreover, a simple pivotal dead-man's control can be actuated in only one single uninterrupted motion. This is disadvantageous since it is conducive to inadvertent actuation of the control. Instead, it would be preferable that two separate actions must be performed on the control member in order to obtain blade rotation.

Certain lawn mower are known in which the cutting blade is directly connected to the drive motor shaft and the drive motor is simply started, often using an electric starting system, to achieve blade rotation. Some of these mowers use a brake to stop blade rotation by braking the drive motor shaft when the drive motor is turned off. U.S. Pat. No. 3,228,177 is an example of a mower of this type using a dead-man's control for actuating the brake and an engine kill switch which positively kills the ignition process in the drive motor when the control is released. Thus, dead-man's controls can be used both with a conventional clutch which selectively couples the blade to the rotating shaft of the drive motor and also with a clutch in the sense of a blade coupled to a drive motor which is started and stopped to get blade rotation. Both types of clutches often utilize brakes to positively stop the cutting blade.

SUMMARY OF THE INVENTION

One aspect of this invention is the provision of a control system for any piece or unit of outdoor power equipment having an active element for performing a ground grooming function and a traction drive. This invention relates to such a control system in which only a single moveable control member is required for actuating the traction drive and the active element. Preferably, the control member of this invention is used on a lawn mowing device having a cutting element as the active element with the cutting element being directly connected to the shaft of the drive motor and including means for selectively starting the drive motor to rotate the cutting element.

This invention relates to an improved outdoor power equipment unit of the type having a housing. An active power driven element is carried on the housing for performing a ground grooming action. A clutch means is provided for selectively activating the active element. In addition, the housing carries selectively operable traction drive means for moving the housing over the ground. The improvement relates to a single moveable control member for activating the traction drive means and the clutch means. This control member is mounted on the housing at a position which is accessible to an operator for manual manipulation thereof.

BRIEF DESCRIPTION OF THE DRAWINGS

This invention will be described in more detail hereafter, when taken in conjunction with the following drawings, in which like reference numerals will refer to like elements throughout.

FIG. 1 is a perspective view of an outdoor power equipment unit having the control system of this invention mounted thereon;

FIG. 2 is a partial cross-sectional view of the control system of this invention taken along lines 2—2 in FIG. 1, particularly illustrating a latch for the control member shown in an unlocked or disengaged position when the control member is in its neutral position;

FIG. 3 is a partial cross-sectional view similar to that of FIG. 2, particularly illustrating the latch in both locked and unlocked positions when the control member is in a first engaged position;

FIG. 5 is a partial cross-sectional view of the control system of this invention taken along lines 5—5 in FIG. 1, particularly illustrating the control member in its neutral position with the clutch means and traction drive means disengaged;

DETAILED DESCRIPTION

Figure 4:
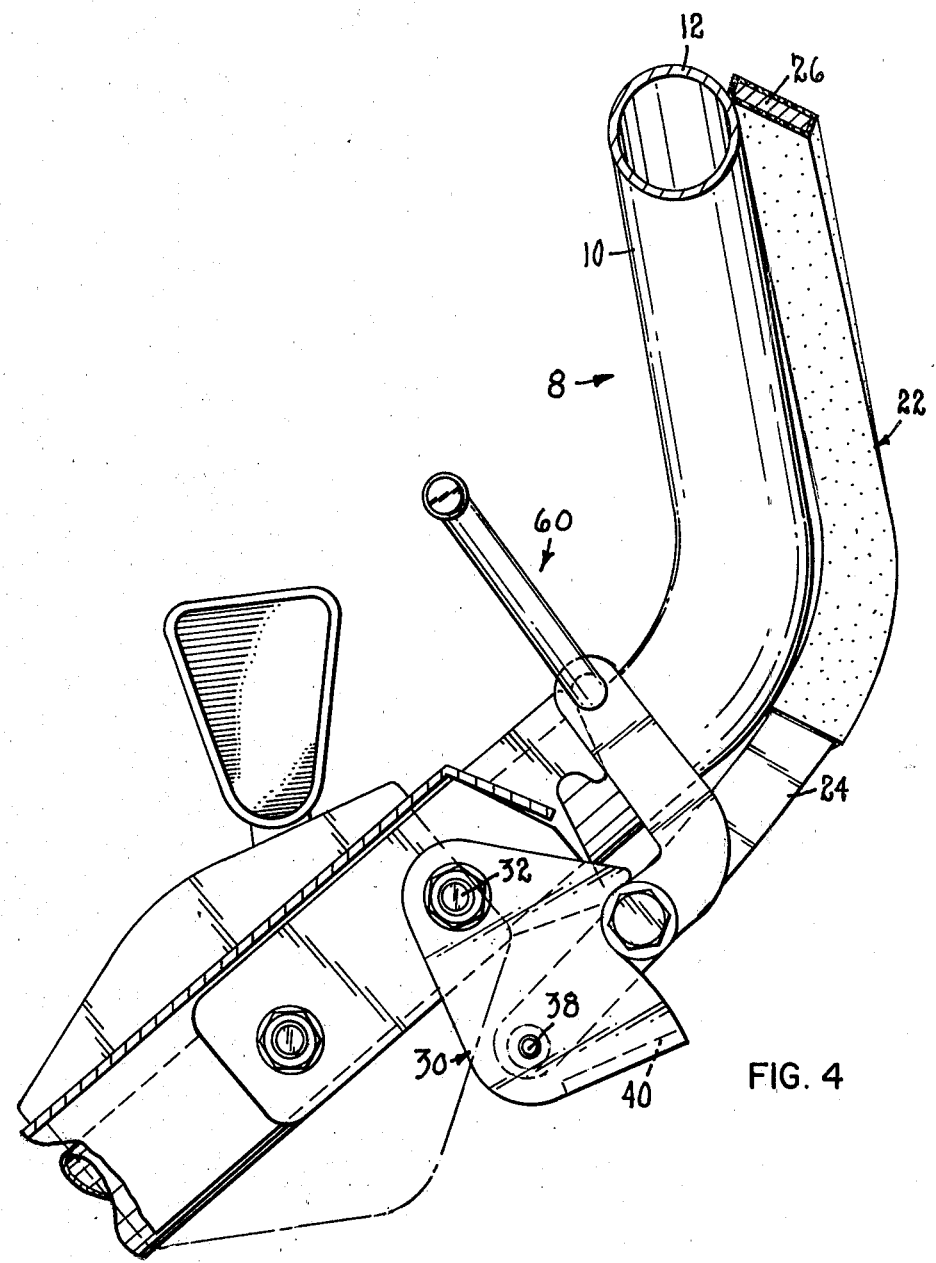
FIG. 4 is a partial cross-sectional view similar to FIGS. 2 and 3, particularly illustrating the latch in an unlocked position when the control member is in a second engaged position.

Referring first to FIG. 1, an outdoor power equipment unit according to this invention is generally referred to as 2. Preferably, outdoor power equipment unit 2 comprises a lawn mower having a wheeled housing 4 for movement over the ground, a rotatable cutting element carried in a cutting chamber in housing 4 for severing grass or other vegetation at predetermined heights above the ground, a brake and clutch means for selectively rotating the cutting element, a traction drive means for self-propelling housing 4 over the ground, and a drive motor 6 for operating both the rotatable cutting element and the traction drive means. Typically, the rotatable cutting element comprises a rigid steel blade.

The lawn mower includes a handle assembly 8 which is connected to housing 4 and forms, in effect, a portion of the housing. Handle assembly 8 comprises two spaced upwardly extending longitudinal rods 10 connected together adjacent their upper ends by a cross rod 12. A control panel 14 is secured to and extends between rods 10 adjacent cross rod 12 and mounts certain controls for operation of the lawn mower. For example, a pivotal throttle 16 is provided for speeding up or slowing down drive motor 6. In addition, control panel 14 also includes a key (not shown) for an electric start system which is preferably part of the lawn mower. When this key is rotated, an electric starter is engaged to start drive motor 6. Generally, handle assembly 8 is positioned so as to locate control panel 14 in an easily accessible position to an operator who is walking behind the lawn mower holding onto the handle assembly.

Preferably, the lawn mower is of the type in which an electric start system is used for starting the drive motor and in which the rigid cutting blade is directly connected to the drive motor shaft. For such a mower, the clutch means earlier referred to constitutes the selectively operable drive motor itself. In addition, any suitable brake can be used for stopping rotation of the cutting blade once the drive motor is stopped and in stopping the drive motor an engine kill switch of any suitable design is preferably used. For example, the type of braking mechanism disclosed in U.S. Pat. No. 3,228,177 and the engine kill switch shown therein could be used in the lawn mower of this invention. Thus, the lawn mower shown herein does include a brake and clutch means for selectively operating the rigid cutting blade with the brake means being used whenever the drive motor is shut off and the clutch means constituting the selectively operable drive motor itself. Alternatively, the lawn mower of this invention could also be of the type in which a conventional clutch is used, i.e. a clutch in which the drive motor continues its operation and the rotatable cutting blade is selectively coupled or uncoupled to the continuously rotating drive shaft. This invention relates to a control system 20 for selectively operating the brake and clutch means and also the traction drive means of the lawn mower. Control system 20 as described hereafter is usable equally with both of the above described alternatives of the lawn mower.

In addition to powered lawn mowers of the types noted above, control system 20 can also be used with other types of outdoor power equipment units. Such a unit should, however, have a self-propelled housing and an active element actuated by a clutch means for performing some type of ground grooming action. For example, motorized rakes and the like well known for raking leaves and certain specialized rakes are known for raking the sand in sand traps on golf courses. Insofar as such raking elements would constitute the active element and insofar as such a unit would have a self-propelled housing, control system 20 would be equally applicable thereto. In addition, certain snow throwers have both a drive means for the device and an active snow throwing element which could be selectively operated by a clutch means. Control system 20 could be applied to such snow throwers as well. Thus, while the primary intended embodiment for use with control system 20 is a powered lawn mower of the self-propelled type, control system 20 is certainly not limited for use with such equipment.

Control system 20 includes a pivotal control member or control bar 22. Control member 22 mimics the shape of handle assembly 8 adjacent its upper end. For example, control member 22 includes two longitudinal rods 24 connected together at their upper ends by a cross rod 26. Rods 24 are spaced apart by a distance slightly less than that between the rods 10 of handle assembly 8. This allows control member 22 to be received between the rods 10 of handle assembly 8. As shown in FIG. 4, rods 24 are bent in a manner similar to the rods 10 to generally conform to the shape thereof so that control member 22 can be folded up against handle assembly 8.

Two traction drive links 30 are pivotally mounted by pivot shafts 32 on the longitudinal rods 10 of handle assembly 8 generally beneath control panel 14. Each traction drive link 30 includes a rearwardly facing hook-shaped shoulder 34. An arcuate recess or bearing surface 36 is located immediately beneath shoulder 34. See FIG. 5. Control member 22 is itself pivotally mounted on the opposed traction drive links 30. The free end of each of the rods 24 is pivotally mounted on one of the traction drive links 30 by a pivot shaft 38. In addition, each of the traction drive links includes a laterally extending bottom flange or stop 40. Flange 40 abuts against the rods 24 of control member 22 when control member 22 is in a neutral position as shown in FIG. 5.

The pivot shaft 38 which pivotally mounts each of the rods 24 of control member 22 also pivotally journals an eyelet 42 of a cable 44. Cable 44 extends from control member 22 to the traction drive means for the lawn mower. In addition, a second cable 46 has an eyelet pivotally secured by a pivot shaft 48 to one of the longitudinal rods 24 at a position offset from that of cable 44. See FIG. 5. Cable 46 leads from control member 22 to the brake means for stopping rotation of the cutting element of the lawn mower and to the engine kill switch.

Figure 6:
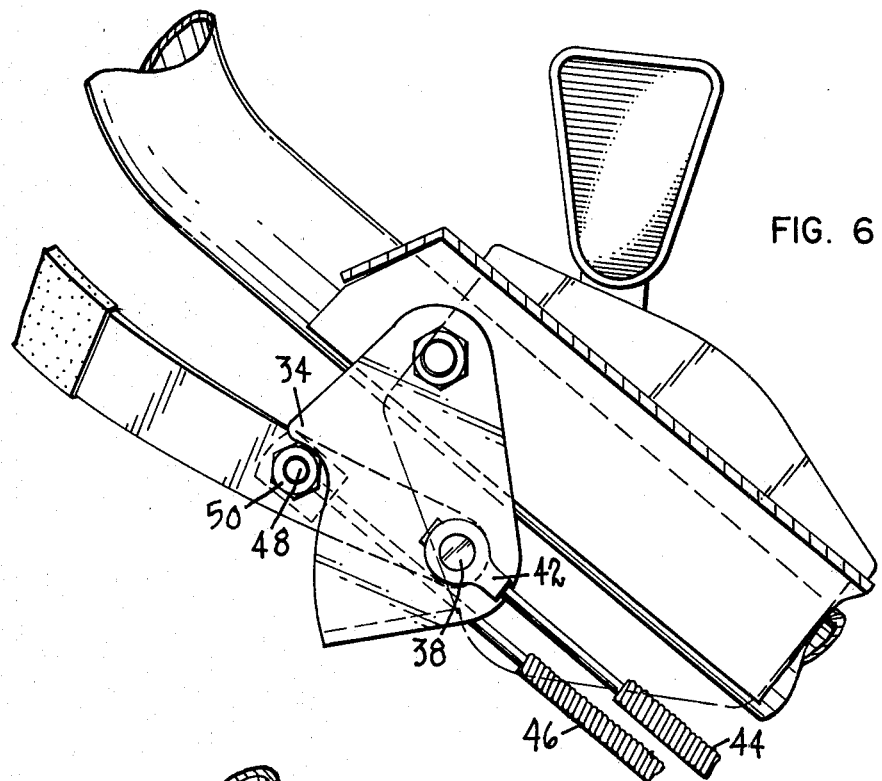
FIG. 6 is a partial cross-sectional view similar to that shown in FIG. 5, particularly illustrating the control member in a first engaged position with the clutch means placed into an operative condition.
Figure 7:
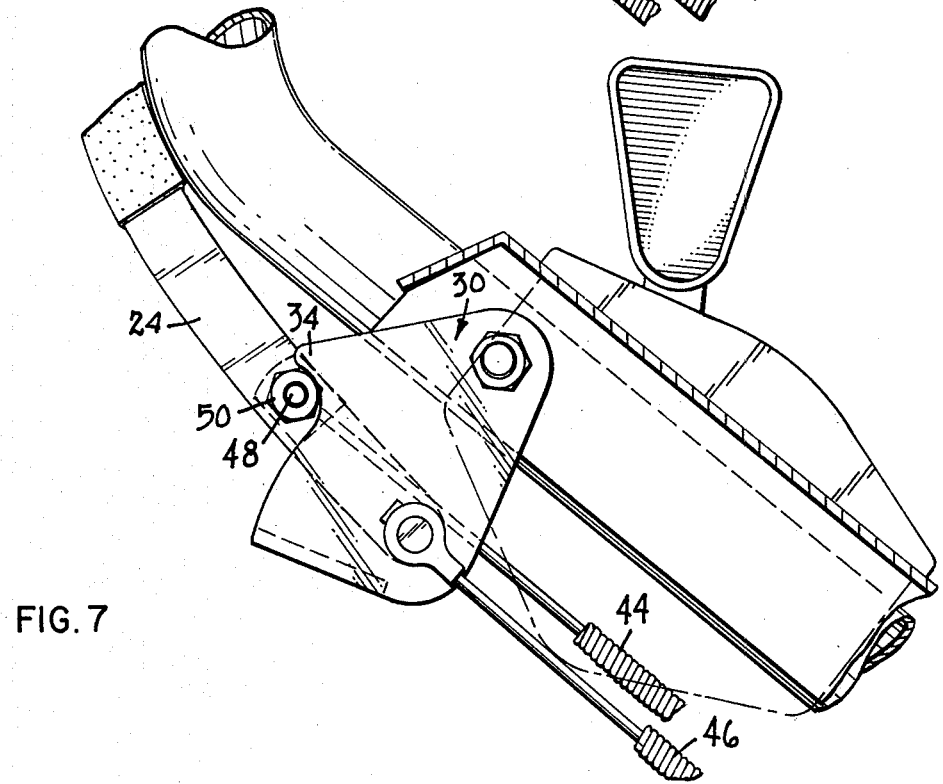
FIG. 7 is a partial cross-sectional view similar to that shown in FIGS. 5 and 6, particularly illustrating the control member in a second engaged position in which both the clutch means and traction drive means are operative.

Referring to FIGS. 5-7, FIG. 5 illustrates a neutral position of control member 22. In this position, cables 44 and 46 are respectively located in positions in which the traction drive means is not engaged and in which the brake means and engine kill switches are engaged. Thus, neither the traction drive means nor the cutting blade are in operation. Control member 22 is normally retained in this neutral position since both the cables 44 and 46 are under spring biasing. Thus, cable 46 tends to rotate control member 22 to its neutral position until rotation of control member 22 is prevented by virtue of the abutment of flanges 40 with rods 24.

Assuming now that the operator wishes to start the blade rotating, he pivots control member 22 in a generally clockwise direction indicated by the arrow A from the neutral position of FIG. 5 to a first engaged position shown in FIG. 6. In this position, a nut 50 on the inner end of pivot shaft 48 has been rotated relatively to traction drive link 30 until it is now located against bearing surface 36 immediately beneath the shoulder 34. See FIG. 6. An identical pivot shaft 48 and nut 50 are provided on the other rod 24, albeit without a second cable 46, to engage bearing surface 36 in the other traction drive link 30. This rotation has also longitudinally moved cable 46 to actuate the brake and clutch means. By this it is meant that the brake has been released and the engine kill switch deactivated so that starting of the drive motor 4 would begin blade rotation. Thus, the operator need only engage the key for the electric starting system to start the drive motor and begin blade rotation.

Continued rotation of the control member 22 from the first engaged position shown in FIG. 6 to the second engaged position shown in FIG. 7 will occur by continued rotation in the clockwise direction A. In the second engaged position, traction drive links 30 have been rotated by virtue of the engagement between the nuts 50 and the bearing surface 36 in each of traction drive links 30. This engagement has rotatively coupled traction drive links 30 to control member 22 so that continued rotation to the second engaged position will physically rotate both traction drive links 30 about their pivot shafts 32. Such rotation causes a longitudinal extension of the cable 44 to begin operation of the traction drive means for the housing. Thus, progressive rotation of the control means 22 from the neutral position shown in FIG. 5 through the first and second engaged positions shown in FIGS. 6 and 7 will progressively cause actuation of the brake and clutch means and actuation of the traction drive means of the lawn mower.

Actual rotation of the cutting blade occurs only after the drive motor has been started by the electric start means located on the control panel. This occurs in the first engaged position of control member 22. A latch 60 shown in FIGS. 2–4 is included on control bar 22 to normally stop the control member in the first engaged position to allow the engine to be started.

As shown in FIGS. 2–4, latch 60 comprises a T-shaped handle 62 which extends above handle assembly 8. See FIG. 1. Handle 62 is connected by a connecting link 64 to one of the longitudinal rods 24 of control member 22. Pivot shaft 48 pivotally connects latch 60 to the control member by journalling connecting link 64 thereon. In addition, one of the rods 10 of handle assembly 8 includes a downwardly facing semi-circular recess 70. Recess 70 is suited for receiving an abutment on latch 60 when control member 22 is in its first engaged position. This abutment comprises the circular rod end 72 of handle 62, where handle 62 connects to link 64. Handle 62 is fixedly secured to link 64 at rod end 72. Rod end 72 projects laterally to one side of the connecting link 64 so that it can be received in the semi-circular recess 70.

Referring to FIG. 2, latch 60 is located in the neutral position of control member 22 entirely beneath recess 70. However, as control member 22 rotates from its neutral to its first engaged position, latch 60 is also rotated therewith until the rod end 72 is received in recess 70. This is illustrated in the solid line position of FIG. 3. Such an engagement stops the rotation of control member 22 in the first engaged position and conveniently locates the control member in the proper position for starting of the drive motor, i.e. with the brake and engine kill switch disengaged. Assuming the operator now starts the drive motor by actuating the key on the control panel, he thereafter may manually release latch 60. This is done by pivoting the latch relative to control member 22 until it reaches the unlocked position shown in phantom in FIG. 3. In this position, rod end 72 has disengaged from the semi-circular recess 70. Then, any further rotation of control member 22 towards the second engaged position simply moves the latch 60 upwardly relative to the handle assembly 8. This has been illustrated in FIG. 4.

Control system 20 according to this invention has numerous advantages. First, a single moveable control member 22 is used for actuating both the traction drive means and the brake and clutch means of the lawn mower according to this invention. This is an improvement over prior art systems utilizing two separate controls for these two elements. Since less materials are used in the control system of this invention, it is less expensive to manufacture and install. In addition, because only one control member 22 is used, it is also somewhat simpler to operate.

In addition, a control system according to this invention gives two distinct actions in order to obtain rotation of the cutting element. The first action is the rotation of the control member from its neutral position to its first engaged position. The presence of latch 60 conveniently stops the control member in this position. The second action arises from manually turning the key for the electric starting system. Thus, it would be very hard to inadvertently start blade rotation with the control system of this invention. This enhances the safety of the lawn mower. Furthermore, the latch 60 is easily and manually releasable to allow continued movement of the control member to a position where both the traction drive and the cutting elements are actuated.

Various modifications of this invention will be apparent to those skilled in the art. For example, nuts 50 on pivot shafts 48 need not necessarily constitute the abutments on control member 22 received against bearing surfaces 36. Any other suitable abutments could be used. In addition, any suitable brake and clutch means, especially as described earlier, or any suitable traction drive means can be activated by control system 22. Thus, the scope of this invention is to be limited only by the appended claims.

I claim:

1. An improved outdoor power equipment unit of the type having a housing; a handle assembly connected to the housing which includes two spaced upwardly extending handle rods; an active power driven element carried on the housing for performing a ground grooming action; clutch means for selectively activating the active element; and selectively operable traction drive means for moving the housing over the ground; wherein the improvement comprises:

(a) a pair of generally opposed traction drive links each of which is pivotally mounted on the handle rods at substantially identical locations adjacent the upper ends of the handle rods;

(b) means for operatively connecting one of the traction drive links to the traction drive means for activating the same upon rotation of the traction drive links;

(c) a single transversly extending control member which extends between the handle rods and is pivotally journalled at each end on one of the traction drive links for free rotation relative to said links, wherein the control member has a neutral position and is pivotal therefrom about its pivot axis in a first direction for movement from the neutral position progressively through first and second engaged positions;

(d) means for operatively connecting the control member to the clutch means for activating the same during rotation of the control member from its neutral position towards its first engaged position; and (e) means for rotatively coupling the control member to the traction drive links in the first engaged position of the control member such that continued rotation of the control member in the first direction towards its second position rotates the traction drive links to activate the traction drive means, whereby a single moveable control member activates both the clutch means and the traction drive means during rotation from the neutral position to the second engaged position.

2. An improved outdoor power equipment unit as recited in claim 1, further including means for normally retaining the control member in its neutral position.

3. An improved outdoor power equipment unit as recited in claim 2, wherein the retaining means comprises means for biasing the control member to its neutral position.

4. An improved outdoor power equipment unit as recited in claim 1, wherein the coupling means comprises an abutment on the control member, and wherein the abutment is engagable with a recess on the traction drive link in the first position of the control member to couple the traction drive link to the control member.

5. An improved outdoor power equipment unit as recited in claim 1, further including means for stopping rotation of the control member in the first position thereof.

6. An improved outdoor power equipment unit as recited in claim 5, wherein the stopping means comprises a latch movably mounted on the control member for movement between locked and unlocked positions when the control member is in its first position, wherein the latch is selectively movable to its unlocked position to allow the control member to rotate from its first to its second position.

7. An improved outdoor power equipment unit as recited in claim 6, wherein the housing includes a recess and the latch includes an abutment which interfits with the recess in the locked position of the latch when the control member is in its first position, and wherein the abutment in the unlocked position of the latch clears the recess for continued movement of the control member.

8. An improved outdoor power equipment unit as recited in claim 7, wherein the latch is pivotally mounted on the control member and includes a handle for gripping by the operator.

* * * * *